(12) United States Patent
Crowther et al.

(10) Patent No.: US 8,754,177 B2
(45) Date of Patent: Jun. 17, 2014

(54) POLYMERIZATION PROCESS

(75) Inventors: Donna J. Crowther, Seabrook, TX (US); John F. Szul, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 770 days.

(21) Appl. No.: 12/637,349

(22) Filed: Dec. 14, 2009

(65) Prior Publication Data

US 2010/0093954 A1 Apr. 15, 2010

Related U.S. Application Data

(63) Continuation of application No. 11/709,508, filed on Feb. 22, 2007, which is a continuation of application No. 10/664,301, filed on Sep. 16, 2003, now Pat. No. 7,199,072.

(60) Provisional application No. 60/437,695, filed on Dec. 31, 2002.

(51) Int. Cl.
*C08F 4/653* (2006.01)
*C08F 4/642* (2006.01)
*C08F 4/6592* (2006.01)
*C08F 210/02* (2006.01)

(52) U.S. Cl.
USPC .......... 526/113; 526/114; 526/126; 526/129; 526/160; 526/165; 526/943; 502/103; 502/113; 502/152; 502/158

(58) Field of Classification Search
USPC .......... 502/103, 113, 152, 158; 526/113, 116, 526/126, 160, 165, 943
See application file for complete search history.

(56) References Cited

U.S. PATENT DOCUMENTS

| 4,530,914 | A | | 7/1985 | Ewen et al. |
|---|---|---|---|---|
| 4,931,417 | A | | 6/1990 | Miya et al. |
| 4,975,403 | A | * | 12/1990 | Ewen ........................... 502/113 |
| 5,525,678 | A | | 6/1996 | Mink et al. |
| 5,648,428 | A | | 7/1997 | Reddy et al. |
| 5,696,045 | A | * | 12/1997 | Winter et al. ................. 502/113 |
| 6,034,192 | A | | 3/2000 | Crowther et al. |
| 6,271,323 | B1 | | 8/2001 | Loveday et al. |
| 6,339,134 | B1 | * | 1/2002 | Crowther et al. ............. 526/128 |
| 6,388,115 | B1 | | 5/2002 | Crowther et al. |
| 6,399,772 | B1 | | 6/2002 | Shin et al. |
| 6,410,474 | B1 | | 6/2002 | Nowlin et al. |
| 6,605,675 | B2 | | 8/2003 | Mawson et al. |
| 6,608,149 | B2 | | 8/2003 | Mawson et al. |
| 7,199,072 | B2 | | 4/2007 | Crowther et al. |
| 2007/0149730 | A1 | | 6/2007 | Crowther et al. |

FOREIGN PATENT DOCUMENTS

| WO | WO 98/49209 | | 11/1998 |
|---|---|---|---|
| WO | WO 00/68279 | * | 11/2000 |
| WO | WO 00/75198 | | 12/2000 |

OTHER PUBLICATIONS

LaPointe, et al., "New Family of Weakly Coordinating Anions," J. Am. Chem. Soc., vol. 122, pp. 9560-9561 (2000).

* cited by examiner

*Primary Examiner* — Caixia Lu
(74) *Attorney, Agent, or Firm* — Jennifer A. Schmidt; Kristina Leavitt

(57) ABSTRACT

The invention relates to a polymerization process, the polymerization process includes contacting a cyclic bridged metallocene catalyst represented by the following formula:

$$L^A(A)L^BMQ_n$$

wherein A is a divalent group bound to each of $L^A$ and $L^B$; each of $L^A$ and $L^B$ are bound to M, and each Q is bound to M;
$L^A$ and $L^B$ are independently selected from the group consisting of cyclopentadienyl ligands and substituted cyclopentadienyl ligands;
A is a divalent bridging group comprising a heterocyclic ring comprising from 3 to 6 carbon atoms and one silyl, thus forming a 4 to 7 member divalent ring;
M is a Group 4, 5, or 6 transition metal;
Q is independently a halogen, a hydride, or a hydrocarbyl radical having from 1 to 20 carbon atoms; wherein n is 1 or 2;
with an activator, and optionally a support, to form an activated catalyst and, subsequently, contacting the activated catalyst with ethylene and optionally, at least one $C_3$-$C_8$ alpha olefin comonomer.

14 Claims, No Drawings

POLYMERIZATION PROCESS

CROSS-REFERENCE TO RELATED APPLICATION

This application is a continuation of Ser. No. 11/709,508, filed Feb. 22, 2007, which is a continuation of Ser. No. 10/664,301, filed Sep. 16, 2003, now U.S. Pat. No. 7,199,072, granted Apr. 3, 2007, that claims the benefit of Ser. No. 60/437,695 filed Dec. 31, 2002; the disclosures of which are incorporate by reference.

BACKGROUND OF THE INVENTIONS

1. Field of the Inventions

The present invention relates to mixed catalyst systems and bimodal polyethylenes made from these mixed catalyst systems; and more particularly, the present invention relates to a catalyst system comprising a cyclic bridged metallocene and a bridged metallocene, preferably supported, capable of producing a bimodal polyethylene.

2. Description of the Related Art

The polymerization processes described herein can be a solution, gas phase, slurry phase or High-pressure process. As discussed in greater detail below, gas phase or slurry phase polymerization processes are preferred, involving catalysts and olefin monomers, at least one of which is ethylene or propylene. As reflected in the patent literature, a great deal of effort has been expended towards discovering improvements in such processes. Some of those patents are identified herein. The improvements offered by the inventions described herein are set forth in greater detail below.

In particular, there is a desire to prepare bimodal polyolefins, especially bimodal polyethylene, using only one reactor as this requires less capital cost than using staged reactors. One method of producing bimodal polyolefins in a single reactor is by using mixed catalyst systems. While some types of mixed catalyst systems are known in the art, for example WO 98/49209; U.S. Pat. No. 4,530,914; U.S. Pat. No. 5,525,678; U.S. Pat. No. 6,271,323; U.S. Pat. No. 6,399,772; U.S. Pat. No. 6,410,474, many of these disclose processes of making bimodal polyethylenes having a relatively high density resin of at least 0.940 g/cm$^3$, with a limited breadth of rheological (e.g., melt flow) properties. It would be desirable to expand on that range.

It has been unexpectedly found that by manipulating the way in which the mixed catalyst system is produced, the rheological properties of the polyolefins produced from those mixed catalysts may be tailored. The present invention is thus directed towards catalyst systems and method of producing catalyst systems having improved properties that expand the range of bimodal polyolefins that can be produced in a single reactor in a single step.

SUMMARY

These and other problems are solved in the present invention which provides in one aspect a process of preparing a mixed catalyst system, comprising:
(a) combining a High melt flow ratio ("MFR") Catalyst with an activator and a support, an inorganic oxide support in one embodiment, to form an activated High MFR catalyst system, the activated High MFR catalyst system comprising the activator and High MFR Catalyst bound to the support; and
(b) combining
  (i) a diluent comprising a mineral or silicon oil with the activated High MFR catalyst system to form a first support slurry; followed by combining a Low MFR Catalyst with the first support slurry; or
  (ii) a diluent comprising a mineral or silicon oil and a Low MFR Catalyst to the activated High MFR catalyst system.

In one embodiment, the High MFR catalyst is a cyclic bridged metallocene; the cyclic bridged metallocene characterized in that it is capable of producing polyethylene with an MFR of 50 or more when activated and is the only catalyst present in a reaction mixture that includes ethylene monomers and is subjected to a gas phase polymerization; and wherein the Low MFR catalyst is a bridged metallocene; the bridged metallocene characterized in that it is capable of producing polyethylene with an MFR of less than 50 when activated and is the only catalyst present in a reaction mixture that includes ethylene monomers and is subjected to a gas phase polymerization.

Another aspect of the present invention provides for a process of polymerizing olefins using the mixed catalyst system of the invention and the bimodal polyethylene produced therefrom, the bimodal polyethylene in one embodiment having a density of from 0.910 to 0.930 g/cm$^3$; a melt index ($I_2$) of from 0.3 to 3 dg/min; a flow index ($I_{21}$) of from 10 to 150 dg/min; and a melt flow ratio (MFR) of from 10 to 80.

Yet another aspect of the present invention provides a supported activated mixed catalyst system comprising an inorganic oxide support having an average particle size of from less than 50 micrometers; an alumoxane activator; a bridged zirconocene and a cyclic bridged zirconocene.

DETAILED DESCRIPTION

Introduction and Definitions

As used herein, structural formulas are employed as is commonly understood in the chemical arts; lines ("—") used to represent associations between a metal atom ("M", Group 3 to Group 12 atoms) and a ligand, ligand atom or atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, the terms "melt flow ratio" and "MFR" are defined herein to mean the ratio of flow index (FI) to melt index (MI). The MFR is also referred to by some as "melt index ratio" (MIR), which is the ratio of "$I_{21}$" to "$I_2$." Both MFR and MIR are measured herein according to ASTM-1238, Condition E, at 190° C.

As used herein, melt strength (MS) should be measured with an Instron capillary rheometer in conjunction with the Goettfert Rheotens melt strength apparatus. A polymer melt strand extruded from the capillary die is gripped between two counter-rotating wheels on the apparatus. The take-up speed is increased at a constant acceleration of 24 mm/sec$^2$, which is controlled by the Acceleration Programmer (Model 45917, at a setting of 12). The maximum pulling force (in units of cN) achieved before the strand breaks or starts to show draw-resonance is determined to be the melt strength. The temperature of the rheometer is set at 190° C. The capillary die has a length of one inch (2.54 cm) and a diameter of 0.06 inches (0.15 cm). The polymer melt is extruded from the die at a speed of 3 inches/min (7.62 cm/min). The distance between the die exit and the wheel contact point should be 3.94 inches (100 mm).

As used herein, the terms "mixed catalyst" or "mixed catalyst system" is used to mean any composition or mixture that includes at least two different catalyst compounds as defined in, for example, (I) and (II) below, and includes at least one suitable activator and a diluent, preferably a diluent of relatively high viscosity that includes a mineral or silicon oil, and optionally a support, the components combined as described herein.

The various catalysts discussed herein are described as being "capable of producing" a polymer (e.g., a polyolefin such as polyethylene) with a particular melt flow ratio (MFR) range and/or with a particular melt strength (MS) range. The phrase "capable of producing" is itself used herein in its broadest sense, to mean that the catalyst in question is capable under any set of reaction conditions to produce a particular polymer, preferably polyethylene, with the recited MFR and/or MS qualities. However, it is understood that that phrase refers to each catalyst in question being used alone in the same type or a similar type of a polymerization, i.e., without any other catalyst. That is, the actual identity of each individual catalyst is determined with reference to that catalyst being used alone in a polymerization reaction. In preferred embodiments of the inventions, the phrase "capable of producing" refers to gas polymerization using ethylene monomers and from 0 to 20 wt % comonomer, by weight of all olefins combined. Although, in determining and selecting the catalysts, gas phase polymerization is preferred, slurry or other types of polymerization are also contemplated.

Preparation of Mixed Catalyst System

In preferred embodiments of the inventions described herein, a polyethylene composition having a desirable combination of properties can be produced by using a mixed catalyst system that is prepared in the manner described herein. In one embodiment, the mixed catalyst system of the invention is prepared by combining a High MFR Catalyst ("HMC") with a support and activator, desirably in a first diluent such as an alkane or toluene, to produce a supported, activated HMC. The supported activated HMC, either isolated from the first diluent or not, is then combined in one embodiment with a high viscosity diluent such as mineral or silicon oil, or a alkane diluent comprising from 5 to 99 wt % mineral or silicon oil to form a slurry of the supported HMC, followed by, or simultaneous to combining with a Low MFR Catalyst ("LMC"), either in a diluent or as the dry solid compound, to form a supported activated mixed catalyst system ("mixed catalyst system"). The mixed catalyst system thus produced is desirably a supported and activated HMC in a slurry, the slurry comprising mineral or silicon oil, with a LMC that is not supported and not combined with additional activator, wherein the Low MFR catalyst may or may not be partially or completely soluble in the slurry.

Described another way, the mixed catalyst system of the present invention is formed by combining a HMC with an activator and a support, and optionally a first diluent, to form an activated High MFR catalyst system, the activated High MFR catalyst system comprising the activator and High MFR Catalyst bound to the support; followed by combining: (i) a diluent comprising mineral or silicon oil to the activated High MFR catalyst system to form a first support slurry; this then followed by combining a LMC with the first support slurry; or in another embodiment, (ii) a diluent comprising mineral or silicon oil and a LMC are combined to the activated High MFR catalyst system to form the mixed catalyst system or "activated, supported mixed catalyst system". In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils and other commercial oils such as paraffin oils sold under such names as KAYDOL™, ISOPAR™, STRUKTOL™, SUNPAR™ oils, PARAPOL™ oils, and other synthetic oils or liquid polymers, polybutenes, refined naphthenic hydrocarbons, refined paraffins known in the art, such as disclosed in BLUE BOOK 2001, MATERIALS, COMPOUNDING INGREDIENTS, MACHINERY AND SERVICES FOR RUBBER 189-247 (J. H. Lippincott, D. R. Smith, K. Kish & B. Gordon eds. Lippincott & Peto Inc. 2001). Preferred mineral and silicon oils useful in the present invention are those that exclude moieties that are reactive with metallocene catalysts, examples of which include hydroxyl and carboxyl groups.

In one embodiment, the diluent is a blend of a mineral or silicon oil and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. In another embodiment, the diluent is a blend of a mineral oil and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the mineral oil is a blend, the diluent comprises from 5 to 99 wt %, by weight of the diluent, of mineral oil. In yet another embodiment, the diluent consists of mineral oil.

In one embodiment, the HMC is combined with an activator and a first diluent to form a catalyst slurry that is then preferably combined with a "support" (typically, a collection of support particles). Until such contact is made, the support particles are preferably not previously activated. The High MFR catalyst can be in any desirable form such as a dry powder, suspension in a diluent, solution in a diluent, liquid, etc. The catalyst slurry and support particles are then mixed thoroughly, in one embodiment at an elevated temperature, so that both the HMC and the activator are deposited on the support particles to form a support slurry. By following the procedures described herein for forming the mixed catalyst, to provide an activated, supported mixed catalyst system, a polymer, particularly a bimodal polyethylene, can be produced with a desirable combination of density, melt flow ratio and melt strength.

After the HMC and activator are deposited on the support, a LMC is then combined with the supported HMC, wherein the LMC is combined with a diluent comprising mineral or silicon oil by any suitable means either before, simultaneous to, or after contacting the LMC with the supported HMC. In one embodiment, the HMC composition is isolated form the first diluent to a dry state before combining with the LMC. Preferably, the LMC is not activated, that is, not combined with any activator, before being combined with the supported HMC. That solids slurry (including both the supported HMC and LMC) is then preferably mixed thoroughly at an elevated temperature.

A wide range of mixing temperatures may be used at various stages of making the mixed catalyst system. For example, in a specific embodiment, when the HMC and at least one activator such as methylaluminoxane are combined with a first diluent to form a mixture, the mixture is preferably heated to a first temperature of from 25° C. to 150° C., preferably from 50° C. to 125° C., more preferably from 75° C. to 100° C., most preferably from 80° C. to 100° C. and stirred for a period of time from 30 seconds to 12 hours, preferably from 1 minute to 6 hours, more preferably from 10 minutes to 4 hours, and most preferably from 30 minutes to 3 hours.

Next, that mixture is preferably combined with a support to provide a first support slurry. The support can be heated, or dehydrated if desired, prior to combining. In one or more embodiments, the first support slurry is mixed at a temperature greater than 50° C., preferably greater than 70° C., more preferably greater than 80° C. and most preferably greater than 85° C., for a period of time from 30 seconds to 12 hours, preferably from 1 minute to 6 hours, more preferably from 10 minutes to 4 hours, and most preferably from 30 minutes to 3 hours. Preferably, the support slurry is mixed for a time sufficient to provide a collection of activated support particles that have the HMC deposited thereto. The first diluent can then be removed from the first support slurry to provide a dried supported HMC. For example, the first diluent can be removed under vacuum or by nitrogen purge.

Next, the LMC is combined with the activated HMC in the presence of a diluent comprising mineral or silicon oil in one embodiment. Preferably, the LMC is added in a molar ratio to the HMC of from 2:1 to 1:3. Most preferably, the molar ratio is approximately 1:1. The resultant slurry (or first support slurry) is preferably heated to a first temperature from 25° C. to 150° C., preferably from 50° C. to 125° C., more preferably from 75° C. to 100° C., most preferably from 80° C. to 100° C. and stirred for a period of time from 30 seconds to 12 hours, preferably from 1 minute to 6 hours, more preferably from 10 minutes to 4 hours, and most preferably from 30 minutes to 3 hours.

One or more additional catalysts may be introduced to the dried supported HMC at the same time or at a later time as the LMC is added in one embodiment. Additional activator may also be added in one embodiment. In a particular embodiment, no additional activator is added.

The first diluent is an aromatic or alkane, preferably hydrocarbon diluent having a boiling point of less than 200° C. such as toluene, xylene, hexane, etc., may be removed from the supported HMC under vacuum or by nitrogen purge to provide a supported mixed catalyst system. Even after addition of the oil and/or the LMC (or other) catalyst component, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may ranges from 1 to 99 wt % solids content by weight of the mixed catalyst system (mineral oil, support, all catalyst compounds and activator(s)) in one embodiment.

The molar ratio of the metal or metalloid activator to the metal in each of the supported metallocene catalyst compounds is in the range of between 0.3:1 to 1000:1, preferably 20:1 to 800:1, and most preferably 50:1 to 500:1. Where the activator is an ionizing activator such as those based on the anion tetrakis(pentafluorophenyl)borate, the molar ratio of the metal or metalloid of the activator component to the metal component of the metallocene catalyst is preferably in the range of between 0.3:1 to 3:1.

As discussed in detail below, the HMC is preferably a cyclic bridged metallocene that is capable of producing polyethylenes with high melt flow ratio (e.g., 50 or higher), but low melt strength (e.g., 6 cN or lower). In at least certain embodiments, the LMC is capable of producing polyethylenes with high melt strength, such as the germanium or silicon bridged metallocenes described below. Preferably, the two catalyst compounds are not contacted with one another prior to the combination of the HMC with the activator and support. It is contemplated that avoiding such contact until after combining the HMC with the activator and support provides an improved mixed catalyst system; and that interactions between the catalysts create undesired deviations in the catalysts' expected behavior. On the other hand, contacting the HMC with a support and activator followed by, with or without isolation, contacting that supported activated catalyst with a LMC (preferably without activator) has been found to provide mixed catalyst systems with improved properties.

Therefore, a catalyst system described herein unexpectedly prevents interactions between a first catalyst compound and a second catalyst compound while producing a polymer with high melt flow ratio. Comparatively, other known procedures for producing a polymer with high melt flow ratio produce polymers that also have an undesirably broad molecular weight distribution. While an embodiment describing adding, first, a HMC to form a supported activated HMC, followed by adding the LMC, it is contemplated that the order of addition could be opposite and that the LMC could first be supported and activated, followed by addition of an HMC in an oil.

High MFR Catalyst

The terms "High Melt Flow Ratio Catalyst," "High MFR Catalyst," and "HMC" mean a catalyst compound capable of producing a polymer with a higher melt flow ratio (MFR) than that of a polymer produced under similar conditions using a Low Melt Flow Ratio Catalyst. In various specific embodiments, the HMC is capable of producing polymers having a MFR of 35 or more; or 40 or more; or 45 or more; or 50 or more; or 60 or more. The "polymer" is preferably a polyolefin, and more preferably polyethylene, including polyethylene copolymers.

The HMC may also be described as a Low Melt Strength Catalyst. The terms "Low Melt Strength Catalyst" and "Low MS Catalyst" mean a catalyst compound capable of producing a polymer with a lower melt strength than that of a polymer produced under similar conditions using a High Melt Strength Catalyst. Preferably, the Low MS Catalyst is capable of producing polymers having a MS of 6 cN or less.

The HMC, in one embodiment, is a cyclic bridged metallocene compound that, when activated with a suitable activator, is capable of producing a polyethylene homopolymer or copolymer in a gas phase process having a high melt flow ratio (MFR), that is, having an MFR of greater than 50 in one embodiment. Preferably, the HMC is also a Low Melt Strength Catalyst, as defined herein. For example, a preferred HMC is silylcyclopentyl(tetramethylcyclopentadienyl)(cyclopentadienyl) zirconium dichloride.

The cyclic bridged metallocene catalyst compound is represented by the following formula:

$$L^A(A)L^BMQ_n \qquad (I)$$

where M is a metal atom from the Periodic Table of the Elements and may be a Group 4, 5 or 6 or from the lanthanide or actinide series of the Periodic Table of Elements, preferably M is a Group 4, 5 or 6 transition metal, more preferably M is a Group 4 transition metal, even more preferably M is zirconium, hafnium or titanium, and even more preferably, zirconium; wherein $L^A$ and $L^B$ are bound to M, each Q is bound to M, and the group A is a bridging group, preferably a divalent bridging group bound to each of $L^A$ and $L^B$ through at least one bond to each.

The ligands, $L^A$ and $L^B$ in (I) and (II), are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof (as described in more detail below), and heterocyclic versions thereof. Independently, each $L^A$ and $L^B$ may be the same or different type of ligand that is bonded to M. In a particular embodiment, in each of (I) and (II) described herein, $L^A$ and $L^B$ are independently cyclopentadienyl ligands, indenyl ligands, tetrahydroindenyl ligands, or substituted versions thereof. In another particular embodiment of (I) and (II), both $L^A$ and $L^B$ are independently cyclopentadienyl ligands or substituted cyclopentadienyl ligands.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. In a particular embodiment, one or both, preferably only one, of $L^A$ and $L^B$ are substituted with hydrocarbons selected from the groups consisting of methyl, ethyl, propyl (all isomers), butyl (all isomers) and mixtures thereof.

Other hydrocarbyl radicals suitable as R groups bound to $L^A$ and/or $L^B$ include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a bond to the metal M.

The metallocenes of (I) and (II) include at least one leaving group Q. For the purposes of this patent specification and appended claims the term "leaving group" is any ligand that can be abstracted from a metallocene catalyst compound to form a metallocene catalyst cation capable of polymerizing one or more olefin(s). Depending on the oxidation state of the metal, the value for n is 0, 1 or 2, preferably 1 or 2, such that formula (I) above represents a neutral metallocene catalyst compound in one embodiment, but compounds described by (I) and (II) are not limited to being neutral, but may also include compounds with an overall positive charge. Non-limiting examples of Q ligands include weak bases such as amines, phosphines, ethers, carboxylates, dienes, hydrocarbyl radicals having from 1 to 20 carbon atoms, hydrides or halogens, preferably chloride or fluoride, and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

The cyclic bridged metallocene catalyst compounds of the invention include those of formula (I) where $L^A$ and $L^B$ are bridged to each other by a cyclic bridging group, A. For the purposes of this patent application and appended claims, the cyclic bridging group A comprises greater than 3 non-hydrogen atoms, preferably greater than 3 carbon atoms forming a ring or ring system comprising at least one other Group 13 to 16 atom. Non-limiting examples of "other" Group 13 to 16 atoms include at least one of a oxygen, nitrogen, silicon, boron, germanium and tin atom or a combination thereof. In a preferred embodiment, the cyclic bridging group A contains a carbon, silicon or germanium atom; most preferably A contains at least one silicon atom. The atoms forming the ring system of A may be substituted with substituents as defined above for R.

In one embodiment, the bridging group A comprises a heterocyclic ring comprising from 3 to 6 carbon atoms and one silyl (divalent) or germyl (divalent) group, thus forming 4 to 7 member divalent rings; wherein the carbon atoms may be substituted with groups such as halides, $C_1$ to $C_5$ alkyls, and other groups. Non-limiting examples of cyclic bridging groups A include cyclo-tri or tetra-alkylene silyl or include cyclo-tri or tetra-alkylene germyl groups, for example, cyclo-trimethylenesilyl group or cyclotetramethylenesilyl group. Desirable bridging groups A are exemplified as follows:

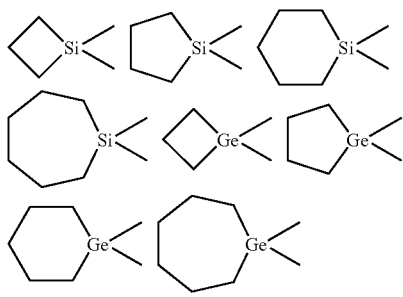

In a preferred embodiment, the cyclic bridged metallocene catalyst compounds of the invention include cyclosilylpentyl (tetramethylcyclopentadienyl)(cyclopentadienyl)zirconium dichloride, cyclotrimethylenesilyl(tetramethyl cyclopentadienyl)(cyclopentadienyl)zirconium dichloride, cyclotetramethylenesilyl(tetramethyl cyclopentadienyl)(cyclopentadienyl) zirconium dichloride, cyclotrimethylenesilyl (tetramethyl cyclopentadienyl) (2-methyl indenyl)zirconium dichloride, cyclotrimethylenesilyl(tetramethyl cyclopentadienyl)(3-methyl cyclopentadienyl)zirconium dichloride, cyclotrimethylenesilyl bis(2-methyl indenyl)zirconium dichloride, cyclotrimethylenesilyl(tetramethyl cyclopentadienyl)(2,3,5-trimethyl cyclopentadienyl)zirconium dichloride, and cyclotrimethylenesilyl bis(tetra methyl cyclopentadienyl)zirconium dichloride.

In one embodiment, the cyclic bridged metallocene catalyst compounds are those where the R substituents on the ligands $L^A$, $L^B$ are substituted with the same or different number of substituents on each of the ligands. In another embodiment, the ligands $L^A$, $L^B$ are different from each other. In a preferred embodiment, the ligands of the cyclic bridged metallocene catalyst compounds of formula (I) are asymmetrically substituted. In another preferred embodiment, at least one of the ligands $L^A$, $L^B$ is unsubstituted. In yet another preferred embodiment, the cyclic bridged metallocene catalyst compounds of the invention are achiral.

Other metallocene catalysts compounds useful in the invention include cyclic bridged heteroatom, mono-metallocene compounds. These types of catalysts and catalyst systems are described in, for example, WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405; and EP-A-0 420 436.

Low MFR Catalyst

The terms "Low Melt Flow Ratio Catalyst," "Low MFR Catalyst," and "LMC" mean a catalyst compound capable of producing a polymer with a lower melt flow ratio (MFR) than that of a polymer produced under similar conditions using a High Melt Flow Ratio Catalyst. In various specific embodiments, the LMC is capable of producing polymers having a MFR of 40 or less; or 30 or less; or 25 or less; or 20 or less. The "polymer" is preferably a polyolefin, and more preferably polyethylene, including polyethylene copolymers.

The LMC may also be described as a High Melt Strength Catalyst. The terms "High Melt Strength Catalyst" and "High MS Catalyst" are defined herein to mean a catalyst compound capable of producing a polymer with a higher melt strength than that of a polymer produced under similar conditions using a Low Melt Strength Catalyst. Melt strength measures the maximum pulling force achieved before a strand of polymer breaks or starts to show draw-resonance under standard conditions. Preferably, the High MS Catalyst is capable of producing polymers having a MS of greater than 6 cN; or greater than 8 cN; or greater than 10 cN; or from 6 to 20 cN; or from 10 to 30 cN.

The low MFR Catalyst, in one embodiment is a bridged metallocene compound that, when activated with a suitable activator, is capable of producing a polyethylene homopolymer or copolymer in a gas phase process having a low melt flow ratio (MFR), that is, having an MFR of less than 50. An example of the low MFR Catalyst is dimethylsilyl(2,3,5-trimethylcyclopentadienyl)(cyclopentadienyl)zirconium dichloride combined with an activator.

The bridged metallocene compound is represented by the formula:

$$R^1R^2EL^AL^BMQ_n \quad (II)$$

where $R^1$ and $R^2$ are each bound to E, each of $L^A$ and $L^B$ are bound to M, and each Q is bound to M, wherein $L^A$ and $L^B$, M, Q and n are as defined above for (I); the $R^1R^2E$ group forms a divalent bridging group, wherein the E group is bound to each of $L^A$ and $L^B$. E is a Group 14 atom, preferably silicon or germanium, preferably silicon.

$R^1$ and $R^2$ are independently selected from the group consisting of hydrogen, halogen and linear or branched alkyl radicals, cyclic alkyls, alkenyls, alkynls and aryl radicals or combinations thereof having from 1 to 30 carbon atoms or other substituents having up to 10 non-hydrogen atoms that can also be substituted. Non-limiting examples of alkyl substituents include methyl, ethyl, propyl, butyl, pentyl, hexyl, cyclopentyl, cyclohexyl, benzyl or phenyl groups and the like, including all their isomers, for example tertiary butyl, isopropyl, etc. Non-hydrogen substituents include carbon, silicon, nitrogen, oxygen and tin. $R^1$ and $R^2$ are preferably not both phenyl.

In a particular embodiment, the LMC is a bridged metallocene compound described by the following formula (II) wherein the $R^1R^2E$ group forms a divalent bridging group, wherein E is silicon or germanium; wherein $R^1$ and $R^2$ are independently selected from the group consisting of $C_1$ to $C_5$ alkyls, $C_6$ to $C_{10}$ aryls, and $C_7$ to $C_{20}$ alkylaryls; M is a Group 4 metal; and Q is a monoanionic leaving group, preferably chloride ion or fluoride ion.

In another particular embodiment, one of $L^A$ or $L^B$ is di-, tri- or tetra-substituted, the substituent groups selected independently from the group consisting of methyl, ethyl, propyl and butyl (all isomers); and even more particularly, one of $L^A$ or $L^B$ is di-, tri- or tetra-substituted cyclopentadienyl ligand, the substituent being methyl. In yet a more particular embodiment, at least one of $L^A$ or $L^B$ is an unsubstituted cyclopentadienyl ligand.

Activators and Activation

For the purposes of this patent specification and appended claims, the term "activator" is defined to be any compound or component that can activate any of the metallocene catalyst compounds of the invention as described above. The catalyst compounds described herein include metallocene catalyst compounds that are preferably activated. Non-limiting activators, for example, may include a Lewis acid or a non-coordinating ionic activator or ionizing activator or any other compound including Lewis bases, aluminum alkyls, conventional-type cocatalysts and combinations thereof that can convert a neutral metallocene catalyst compound to a catalytically active metallocene cation. For example, the activator can be use an aluminum alkyl, alumoxane, modified alumoxane or any other oxy-containing organometallic compound or non-coordinating activators, or a combination thereof. The non-coordinating anion is typically a chemically stable, non-nucleophilic anionic complex, preferably having a molecular diameter of 4 Å or greater, such as tri(n-butyl)ammonium tetrakis(pentafluorophenyl)boron or a trisperfluorophenyl boron metalloid precursor that would ionize the neutral metallocene catalyst compound.

The method of activating the mixed catalyst system is described above. In a preferred embodiment, the activator is co-supported with one catalyst compound in any suitable order of addition, preferably in a first diluent, to form a supported, activated catalyst compound. The second added catalyst compound is, in one embodiment, activated by contacting the supported activator and catalyst compound in a high viscosity diluent, either heated or kept at room temperature, prior to entering the polymerization reactor. In a particular embodiment, the activator is an alumoxane, methalumoxane (MAO) in a more particular embodiment. The second catalyst compound, for example the LMC as described above, may be added to the slurry at any time prior to entering the reactor, and for any desirable length of time from less than a second to any number of days.

There are a variety of methods for preparing aluminoxane and modified aluminoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and PCT publication WO 94/10180.

In one embodiment, an activation method using ionizing ionic compounds not containing an active proton but capable of producing both a metallocene catalyst cation and a non-coordinating anion are also contemplated, and are described in EP-A-0426 637, EP-A-0 573 403 and U.S. Pat. No. 5,387,568.

Ionizing compounds may contain an active proton, or some other cation associated with but not coordinated to or only loosely coordinated to the remaining ion of the ionizing compound. Such compounds are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994.

Other activators include those described in PCT publication WO 98/07515 such as tris (2,2',2"-nonafluorobiphenyl) fluoroaluminate. Combinations of activators are also contemplated by the invention, for example, aluminoxanes and ionizing activators in combinations, see for example, PCT publications WO 94/07928 and WO 95/14044 and U.S. Pat. Nos. 5,153,157 and 5,453,410. WO 98/09996, describes activating metallocene catalyst compounds with perchlorates, periodates and iodates including their hydrates. WO 98/30602 and WO 98/30603, describe the use of lithium (2,2'-bisphenyl-ditrimethylsilicate).4THF as an activator for a metallocene catalyst compound. Also, methods of activation such as using radiation (see, EP-B1-0 615 981) and electro-chemical oxidation are also contemplated as activating methods for the purposes of rendering the neutral metallocene catalyst compound or precursor to a metallocene cation capable of polymerizing olefins.

In a specific embodiment of preparing a supported mixed catalyst system, the molar ratio between a first catalyst compound and at least one activator such as methylaluminoxane (MAO) is preferably from 1:1 to 1000:1, most preferably 50:1 to 500:1.

Support

The mixed catalyst systems described herein refer to catalysts in a supported form, for example deposited on, bonded to, contacted with, or incorporated within, adsorbed or absorbed in, or on, a "support," also referred to as a "carrier." In a preferred embodiment, the catalyst compounds described above are combined with a support using a process for supporting the catalysts that produces a catalyst system capable of producing polymers with desired properties including target melt flow ratios, melt index ratios, and melt strengths.

The terms "support" or "carrier" are used interchangeably and are any support material or particles, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred carriers are inorganic oxides that include those Group 2, 3, 4, 5, 13 or 14 metal oxides, more particularly, those of Groups 13 and 14, and even more particularly, aluminum and/or silicon oxides. The preferred supports include silica, alumina, silica-alumina, magnesium chloride, and mixtures thereof. Other useful supports include magnesia, titania, zirconia, montmorillonite (EP-B1 0 511 665) and zeolites. Also, combinations of these support materials may be used, for example, silica-chromium, silica-alumina and silica-titania. The support can be dehydrated at least 600° C., more preferably at least 700° C., and most preferably at least 800° C. When used in preparing a supported mixed catalyst system, the support can be heated from 30° C. to 100° C., preferably from 40° C. to 100° C., more preferably from 70° C. to 100° C., most preferably from 85° C. to 100° C.

It is preferred that the carrier, most preferably an inorganic oxide, has a surface area in the range of from 10 to 700 $m^2/g$, a pore volume in the range of from 0.1 to 4.0 cc/g and an average particle size in the range of from 5 to 500 μm. More preferably, the surface area of the carrier is in the range of from 50 to 500 $m^2/g$, a pore volume of from 0.5 to 3.5 cc/g and an average particle size of from 10 to 200 μm. Most preferably the surface area of the carrier is in the range of from 100 to 400 $m^2/g$, a pore volume from 0.8 to 3.0 cc/g and an average particle size of from 5 to 100 μm. More particularly, the average particle size of the carrier ranges from less than 100 μm in one embodiment, from less than 50 μm in another embodiment, from less than 35 μm in yet another embodiment, and may range from greater than 0.1 μm in yet another embodiment, and greater than 1 μm in yet another embodiment. The average pore size of the carrier is in the range of from 10 to 1000 Å, preferably 50 to about 500 Å, and most preferably 75 to about 350 Å.

Polymerization Processes

The mixed catalysts described herein are preferably used to make bimodal polyolefin compositions, i.e., a composition having a bimodal molecular weight distribution. Once the supported mixed catalyst composition is prepared, as described above, a variety of processes can be carried out using that composition. Among the varying approaches that can be used include procedures set forth in U.S. Pat. No. 5,525,678, in which those processes are modified to utilize the mixed catalyst compositions described herein. The equipment, process conditions, reactants, additives and other materials will of course vary in a given process, depending on the desired composition and properties of the polymer being formed. For example, the processes discussed in any of the following patents can be used: U.S. Pat. Nos. 6,420,580; 6,388,115; 6,380,328; 6,359,072; 6,346,586; 6,340,730;

6,339,134; 6,300,436; 6,274,684; 6,271,323; 6,248,845; 6,245,868; 6,245,705; 6,242,545; 6,211,105; 6,207,606; 6,180,735; and 6,147,173.

The mixed catalyst system is typically added to the reactor by any suitable means such as by injection through a line directly into the reactor, and in the case of a gas phase process, may be injected directly into the fluidized bed; and carriers such as isopentane, nitrogen gas, recycle gas, or combinations thereof may be used to deliver the mixed catalyst to the reactor. The mixed catalyst is delivered to the reactor and contacted with olefins as a slurry composition in a mineral or silicon oil as described above; in one embodiment, the mixed catalyst system ranges from 1 to 99 wt % solids content by weight of the mixed catalyst system (oil, support, all catalyst compounds and activator(s)), the mixed catalyst system ranges from 1 to 50 wt % solids content by weight of the mixed catalyst system in another embodiment, and in yet another embodiment, ranges from 5 to 40 wt % solids, and ranges from 10 to 30 wt % solids in another embodiment, and ranges from 10 to 25 wt % solids in yet another embodiment.

The catalysts and catalyst systems described above, e.g., mixed catalyst compositions, can be used in a variety of polymerization processes, over a wide range of temperatures and pressures. The temperatures may be in the range of from −60° C. to about 280° C., preferably from 50° C. to about 200° C., and the pressures employed may be in the range from 1 atmosphere to about 500 atmospheres or Higher.

Polymerization processes include solution, gas phase, slurry phase and a High pressure process or a combination thereof. Particularly preferred is a gas phase or slurry phase polymerization of one or more olefins at least one of which is ethylene or propylene.

In certain embodiments, the process of this invention is directed toward a solution, High pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, 1-butene, 1-pentene, 4-methyl-1-pentene, 1-hexane, 1-octane and 1-decene.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the mixed catalyst systems described herein.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028, 670, 5,317,036, 5,352,749, 5,405,922, 5,436,304, 5,453,471, 5,462,999, 5,616,661 and 5,668,228)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from 30 or 40 or 50 or 60 or 70° C. to 90 or 95 or 100 or 105 or 110 or 115 or 120 or 130° C., a desirable temperature range comprising any combination of any upper limit with any lower limit.

Other gas phase processes contemplated by the process of the invention include those described in U.S. Pat. Nos. 5,627, 242, 5,665,818 and 5,677,375, and European publications EP-A-0 794 200, EP-A-0 802 202 and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A particle form polymerization, i.e., a type of slurry process, can be used wherein the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

A solution process can also be used. Examples of solution processes are described in U.S. Pat. Nos. 4,271,060, 5,001, 205, 5,236,998 and 5,589,555.

In an embodiment of the invention, a slurry or gas phase process is used in the presence of a metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. Such a process is described in PCT publication WO 96/08520 and U.S. Pat. Nos. 5,712,352 and 5,763,543. In another specific embodiment, the process is operated by introducing a carboxylate metal salt into the reactor and/or contacting a carboxylate metal salt with the metallocene catalyst system of the invention prior to its introduction into the reactor, such as, for example, an aluminum fatty acid compound.

Polymer Product

The polymers produced by the processes described herein, utilizing the mixed catalysts described herein, which are preferably bimodal, can be used in a wide variety of products and end-use applications. The polymers produced by the process of the invention include linear low density polyethylene, elastomers, plastomers, High density polyethylenes, low density polyethylenes, medium density polyethylenes, polypropylene and polypropylene copolymers. Desirably, the mixed catalyst system and method of producing bimodal polyethylenes described herein is capable of producing "low density" bimodal resins having a density of less than, for example, 0.935 g/cm$^3$.

Polymers that can be made using the described processes can have a variety of compositions, characteristics and properties. At least one of the advantages of the mixed catalysts is that the process utilized can be tailored to form a polymer composition with a desired set of properties. The polymers, typically ethylene based polymers, have a density of from 0.86 g/cm$^3$ or 0.88 g/cm$^3$ or 0.900 g/cm$^3$ or 0.905 g/cm$^3$ or 0.910 g/cm$^3$ or 0.915 g/cm$^3$ to 0.925 g/cm$^3$ or 0.930 g/cm$^3$ or 0.935 g/cm$^3$.

The polymers should have a molecular weight distribution (a weight average molecular weight to number average molecular weight, $M_w/M_n$) of between 5 or 10 or 12 or 15 or 20 and 30 or 35 or 40 or 50 or 60 or 80.

The polymers made by the described processes can in certain embodiments have a melt index (MI) or ($I_2$ as measured by ASTM-D-1238-E 190° C.) in the range from 0.01 dg/min to 100 dg/min, more preferably from about 0.1 dg/min to about 20 dg/min, even more preferably from about 0.2 dg/min to about 5 dg/min, and most preferably from about 0.3 dg/min to about 3 dg/min, wherein a desirable range comprises any upper limit with any lower limit described herein.

Polymers made by the described processes can in certain embodiments have a melt index ratio (MFR, $I_{21}/I_2$) (flow index, $I_{21}$ is measured by ASTM-D-1238-F at 190° C.) of from 5 or 10 or 15 or 20 or 25 or 30 to 40 or 45 or 50 or 60 or 80 or 100 or 150 or 200.

In certain embodiments, propylene based polymers can be produced using the processes described herein. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117.

The polymers of the invention may be blended and/or coextruded with any other polymer. Non-limiting examples of other polymers include linear low density polyethylenes produced via conventional Ziegler-Natta and/or metallocene catalysis, elastomers, plastomers, High pressure low density polyethylene, High density polyethylenes, polypropylenes and the like.

Polymers produced by the process of the invention and blends thereof are useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

Example 1

In this example, two mixed catalyst systems ("MCS 1" and "MCS 2") were prepared. Each mixed catalyst system included silylcyclopentyl(tetramethylcyclopentadienyl)(cyclopentadienyl)zirconium dichloride (the 'first catalyst compound', also referred to herein as C1), and dimethylsilyl(2,3,5-trimethyl cyclopentadienyl)(cyclopentadienyl) zirconium dichloride (the 'second catalyst compound', also referred to as C2).

To prepare MCS 1 and 2, a solution of 30 wt. % methylaluminoxane (MAO) was added to a flask in a glove box. Toluene was added while stirring followed by the addition of C1. The mixture was stirred. Then Crossfield 948 silica was added slowly to the solution and mixed. The mixture was then dried to produce a free flowing solid. Next, mineral oil was added to the free flowing solid and mixed. Then the appropriate amount of C2 was added to this slurry and stirred. This mixture was then treated to remove volatile diluents such as any remaining toluene as by vacuum or $N_2$ purge, to produce a "dry" oil slurry used as a mixed catalyst system MCS 1 in a 1:1 molar ratio of C1 to C2; and MCS 2 in a 1:2 molar ratio of C1 to C2.

Each of the MCS samples was then used in a different polymerization run, both polymerizing ethylene and butene comonomers to produce polyethylene. The hydrogen and/or comonomer concentration in the reactor was varied to produce polyethylene resins of differing melt indexes, the target $I_2$ for the polymerizations was 0.75 dg/min and 2.0 dg/min. The physical properties of each resulting polyethylene are reported in Table 1 and were measured using standard ASTM techniques.

More specifically, each polymerization was run in a continuous gas phase fluidized bed reactor. The gaseous feed streams of ethylene and hydrogen together with liquid comonomer were mixed together in a mixing tee arrangement and introduced below the reactor bed into the recycle gas line. The individual flow rates of ethylene, hydrogen and butene comonomer were controlled to maintain fixed composition targets. The ethylene concentration was controlled to maintain a constant ethylene partial pressure. The hydrogen was controlled to maintain constant hydrogen to ethylene mole ratio. The concentration of all the gases was measured by an on-line gas chromatograph to ensure relatively constant composition in the recycle gas stream. The mixed catalyst system sample was injected as approximately a 17 wt % solids (insoluable materials, e.g., the supported catalyst and activator, etc) in a slurry with Kaydol oil into the fluidized bed using purified nitrogen. The reacting bed of growing polymer particles was maintained in a fluidized state by the continuous flow of the make up feed and recycle gas through the reaction zone. To maintain a constant reactor temperature, the temperature of the recycle gas was continuously adjusted up or down to accommodate any changes in the rate of heat generation due to the polymerization. The fluidized bed was maintained at a constant height by withdrawing a portion of the bed at a rate equal to the rate of formation of particulate product. The product was removed semi-continuously via a series of valves into a fixed volume chamber, which was simultaneously vented back to the reactor. This allowed for highly efficient removal of the product, while at the same time recycling a large portion of the unreacted gases back to the reactor. This product was purged to remove entrained hydrocarbons and treated with a small stream of humidified nitrogen to deactivate any trace quantities of residual catalyst.

TABLE 1

Polymerization results

| PE property | MCS 1 | MCS 1 | MCS 2 | MCS 2 |
|---|---|---|---|---|
| Density (g/cm$^3$) | 0.920 | 0.9210 | 0.9204 | 0.9207 |
| MI (dg/min) | 0.76 | 1.98 | 0.80 | 1.9 |
| FI (dg/min) | 33.8 | 84.1 | 32.2 | 70.1 |
| MFR | 44.5 | 42.5 | 40.2 | 36.9 |

The present invention is unique in that the mixed catalyst systems described herein are capable of making, in a single gas phase polymerization reactor, a bimodal polyethylene that is "low density", that is, having a density of from less than 0.940 g/cm$^3$. In a particular embodiment, the process of the invention is capable of producing a bimodal polyethylene having a density of from 0.910 to 0.935 g/cm$^3$; a melt index ($I_2$) of from 0.3 to 3 dg/min; a flow index ($I_{21}$) of from 10 to 150 dg/min; and a melt flow rate (MFR) of from 10 to 80. In another embodiment, the process of the invention is capable of producing a bimodal polyethylene having a density of from 0.915 to 0.925 g/cm$^3$; a melt index ($I_2$) of from 0.4 to 2.5 dg/min; a flow index ($I_{21}$) of from 12 to 100 dg/min; and a melt flow rate (MFR) of from 20 to 60. The Mw/Mn values of these bimodal polyethylenes ranges from 10 to 50 in one embodiment, and from 12 to 40 in another embodiment, and from 15 to 30 in yet another embodiment, wherein a desirable range includes any upper limit with any lower limit described herein.

The invention described herein also includes a bimodal polyethylene having, in one embodiment, a density of from 0.910 to 0.930 g/cm$^3$; a melt index ($I_2$) of from 0.3 to 3 dg/min; a flow index ($I_{21}$) of from 10 to 150 dg/min; and a melt flow rate (MFR) of from 10 to 80. The polyethylene is produced in a single gas phase fluidized bed reactor in a particular embodiment; and in a more particular embodiment, is produced by combining ethylene and butene or 1-hexene with a supported activated mixed catalyst system. Even more particularly, the supported activated mixed catalyst system comprises an inorganic oxide support having an average particle size of from less than 50 micrometers; an alumoxane activator; a bridged zirconocene and a cyclic bridged zirconocene. The zirconocenes are metallocenes as described above in (I) and (II), wherein the metal M is zirconium. In yet a more particular embodiment, the supported activated mixed catalyst system used to make the bimodal polyethylene comprises an inorganic oxide support has an average particle size of from less than 35 micrometers.

In a particular embodiment, the supported activated mixed catalyst system is formed by first combining a cyclic bridged zirconocene, an alumoxane and an inorganic oxide support to form an activated, supported cyclic bridged zirconocene; followed by combining the activated, supported cyclic bridged zirconocene with a diluent selected from the group consisting of alkanes, aromatic hydrocarbons, mineral oils, silicon oils, and combinations thereof to form a first support slurry; followed then by combining a bridged zirconocene with the first support slurry to form the supported activated mixed catalyst system. As used herein, mineral oils includes synthetic oils sold under such names as ISOPAR™ STRUKTOL™ oils, SUNPAR™ oils, PARAPOL™ oils, and other synthetic oils or liquid polymers known in the art.

In a particular embodiment of the invention, the LMC is combined with the activated supported HMC in the substantial absence of additional activator. By "substantial absence of additional activator", it is meant that no activator is added to the LMC prior to combining with the activated supported HMC (first support slurry), and no additional activator is added to the entire mixed catalyst system.

In another particular embodiment, the polymerization conditions (temperature, amount of comonomer, amount of hydrogen, etc.) are chosen so that the resulting polyethylene derived from each catalyst component has an $I_2$ value of within 2.0 or 1.0 dg/min of one another; and within 0.8 dg/min in yet another embodiment. And in another embodiment, conditions are chosen so that the $I_2$ values of the resulting polyethylene derived from each catalyst component has an $I_2$ value of from 0.1 to 5 dg/min in one embodiment, and from 0.2 to 3 dg/min in another embodiment. Described another way, in one embodiment of the invention the polymerization conditions are chosen such that the $I_2$ of the polyethylene produced from the first catalyst compound ranges from 1 to 3 dg/min, and the $I_2$ of the polyethylene produced from the second catalyst compound ranged from 1 to 3 dg/min.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A polymerization process, the polymerization process comprising contacting ethylene and, optionally, at least one $C_3$-$C_8$ alpha olefin comonomer, with an activated mixed catalyst system in a polymerization reactor, wherein the mixed catalyst system comprises:
(a) a first catalyst component that comprises a cyclic bridged metallocene catalyst, an activator, and optionally a support; wherein the cyclic bridged metallocene catalyst is represented by the following formula:

wherein A is a divalent group bound to each of $L^A$ and $L^B$; each of $L^A$ and $L^B$ are bound to M, and each Q is bound to M;

$L^A$ and $L^B$ are independently selected from the group consisting of cyclopentadienyl ligands and substituted cyclopentadienyl ligands;

A is a cyclotetramethylenesilyl group, thus forming a divalent ring;

M is zirconium or hafnium;

Q is independently chlorine or fluorine;

wherein n is 1 or 2;

(b) a second catalyst component that comprises a bridged metallocene compound represented by the following formula:

$R^1R^2EL^AL^BMQ_n$ wherein $R^1$ and $R^2$ are each bound to E, and E is bound to each of $L^A$ and $L^B$; each of $L^A$ and $L^B$ are bound to M, and each Q is bound to M;

$L^A$ and $L^B$ are independently selected from the group consisting of cyclopentadienyl ligands and substituted cyclopentadienyl ligands;

wherein the $R^1R^2E$ group forms a divalent bridging group, wherein E is silicon or germanium; wherein $R^1$ and $R^2$ are independently $C_1$ to $C_5$ alkyls;

M is zirconium or hafnium; wherein n is 1 or 2; and Q is chlorine or fluorine;

wherein the first catalyst component is capable of producing a polymer with a melt flow ratio $I_{21}/I_2$ measured according to ASTM 1238 Conditions E and F at 190° C., of 35 or more and the second catalyst component is capable of producing a polymer with a melt flow ratio of 50 or less;

and wherein the activated mixed catalyst system is introduced to the polymerization reactor as a slurry comprising the mixed catalyst system in a mineral oil or silicon oil.

2. The polymerization process of claim 1, wherein $L^A$ is a cyclopentadienyl ligand and $L^B$ is a substituted cyclopentadienyl ligand.

3. The polymerization process of claim 1, wherein n is 2.

4. The polymerization process of claim 1, wherein the metallocene catalyst is cyclotetramethylenesilyl(tetramethylcyclopentadienyl)(cyclopentadienyl)$MQ_2$, wherein M is zirconium or hafnium, and Q is flourine.

5. The polymerization process of claim 1, wherein the activator comprises an alumoxane, a Lewis acid, a non-coordinating anion, or mixtures thereof.

6. The polymerization process of claim 5, wherein the activator is methylaluminoxane.

7. The polymerization process of claim 1, wherein the support is present to produce a supported activated catalyst.

8. The polymerization process of claim 7, wherein the support is an inorganic oxide.

9. The polymerization process of claim 8, wherein the inorganic oxide is silica.

10. The polymerization process of claim 9, wherein the silica has an average particle size less than 50 μm.

11. The polymerization process of claim 1, wherein the at least one $C_3$-$C_8$ alpha olefin comonomer is butene.

12. The polymerization process of claim 1, wherein the polymerization process further comprises hydrogen.

13. The polymerization process of claim 1, wherein the polymerization process is a gas phase polymerization process.

14. The polymerization process of claim 13, wherein the polymerization process occurs in a continuous gas phase fluidized bed reactor.

* * * * *